United States Patent [19]

Talke

[11] Patent Number: 5,396,029
[45] Date of Patent: Mar. 7, 1995

[54] VEHICLE-CARRIED VIBRATOR FOR PRODUCING SEISMIC VIBRATIONS

[75] Inventor: Herbert Talke, Celle, Germany

[73] Assignee: Prakla-Seismos GmbH, Hanover, Germany

[21] Appl. No.: 87,429

[22] Filed: Jul. 6, 1993

[30] Foreign Application Priority Data

Jul. 6, 1992 [DE] Germany .................. 42 22 135.8

[51] Int. Cl.⁶ .............................................. G01V 1/02
[52] U.S. Cl. .................................................... 181/114
[58] Field of Search .......................... 181/114; 367/189

[56] References Cited

U.S. PATENT DOCUMENTS

| | | | |
|---|---|---|---|
| 3,306,391 | 2/1967 | Bays | 181/114 |
| 3,866,709 | 2/1975 | Mifsud | 181/114 |
| 4,011,923 | 3/1977 | Talke et al. | 181/114 |
| 4,114,722 | 9/1978 | Weber et al. | 181/114 |
| 4,147,228 | 3/1979 | Bouyoucos | 181/114 |
| 4,712,641 | 12/1987 | Chelminski | 181/114 |
| 4,853,907 | 8/1989 | Bays | 181/114 |

FOREIGN PATENT DOCUMENTS

| | | |
|---|---|---|
| 1473922 | 2/1970 | Germany . |
| 2509704 | 9/1976 | Germany . |
| 2737991 | 3/1978 | Germany . |
| 2745213 | 6/1978 | Germany . |

*Primary Examiner*—Daniel T. Pihulic
*Attorney, Agent, or Firm*—Walter C. Farley

[57] ABSTRACT

A vibrator for producing seismic vibrations in the earth is carried by a vehicle. The vibrator has a base plate, a reaction mass and support plates and a lifting and lowering apparatus for raising and lowering the vibrator between a raised transportation position and a lowered operating position in which the base plate is pressed against the ground. The lifting and lowering apparatus includes piston and cylinder units each connected at one end to the vehicle chassis and at the other to a support plate. In one embodiment, the piston and cylinder units are attached to the vehicle by belt-type pivotable bearings to permit swiveling of the vibrator so that the base plate is tiltable to adapt to an uneven earth surface. In another embodiment, the piston and cylinder units are attached to the vibrator by spherical pendulum support bearings which also allow swiveling and tilting of the base plate.

16 Claims, 5 Drawing Sheets

VEHICLE-CARRIED VIBRATOR FOR PRODUCING SEISMIC VIBRATIONS

FIELD OF THE INVENTION

This invention relates to a device having a vibrator which is attached to a vehicle and which can be lowered against the surface of the earth to produce seismic vibrations.

BACKGROUND OF THE INVENTION

Mobile vibrators are often used for producing seismic vibrations. The vibrators are usually attached to a vehicle which is constructed specifically for this purpose.

In a vibrator, instead of pulse excitation, a succession of vibrations of relatively small pressure amplitude and lasting several seconds is produced. The vibration frequency can be varied according to selected time functions. Non-linear frequency vibrations of virtually any type can also be achieved with the aid of suitable control apparatus.

A vibrator has the main components, a base plate and a reaction mass, which together can be caused to vibrate relative to each other by means of a piston-cylinder unit. The entire vibrator is connected to the vehicle by a lifting and lowering device. To use the vibrator, the base plate is lowered onto the ground and pressed against the ground by means of the lifting and lowering device. The pressing continues to the extent that the vehicle is raised at the front or the rear such that substantially the entire weight of the vehicle rests on the vibrator as a static preload. Relatively large amplitude vibrations can thus be achieved.

With the use of such vibrators, P-waves are usually produced. A desired directional characteristic can be achieved by synchronous, dephased excitation of a group of vibrators arranged spaced apart. Thus, it is also possible to produce shear waves with such vibrators.

German patent document A 2,509,704 discloses a vehicle having a vibrator in which the vibrator is arranged at the free end of a frame-type support which is linked to a chassis and can be swiveled relative thereto. A lifting device is attached with spacing from the ground vibrator between the chassis and the swivelable support. In this apparatus, the lifting device includes a piston-cylinder unit whose ends are pivotally connected to the chassis and to the swivelable support frame. The swivelable support frame has swivel arms which are arranged on the chassis and to whose ends the support plate of the vibrator is attached. Arranged parallel to the swivel arms are compensating arms which, due to their telescoping construction, allow the base plate of the vibrator to be tilted ion the longitudinal direction of the vehicle.

Although this arrangement has proven to be expedient over many years, its design is very costly and is no longer in tune with current design possibilities.

German A 1,473,922 discloses a vibrator which is attached to a vehicle and can be raised and lowered by two lifting cylinders arranged at the side of the vehicle. The connection part between the base plate and the lifting part is of flexible construction to compensate for unevenness of the ground. However, this has the disadvantage that the transmittable vibration energy is impaired and the flexible part is additionally subjected to great wear.

U.S. Pat. No. 3,866,709 discloses a vibrator which is attached at the upper end to a holding bar having a spherical end. This also allows the vibrator to be tilted our of the horizontal plane. However, this arrangement does not specify any possibility of imposing the entire weight of the vehicle on the vibrator.

German A 2,737,991 shows a seismic wide-band vibrator whose base plate can be tilted out of the horizontal plane by a special arrangement of stabilizing bars. However, the vibration system and the reaction mass remain in a vertical alignment relative to the vehicle such that a shearing effect can occur due to the angular arrangement of the base plate relative to the reaction mass, which shearing effect can lead to rapid wear of the vibrator and undesirable generation of shear waves.

German A 2,745,213 discloses a vehicle having a seismic source in accordance with the impact principle wherein a central cylinder unit suspended by universal joints serves for raising and pressing the base plate against the ground.

If the force applied is insufficient, additional piston-cylinder units can act directly on the base plates through fork connections. However, the direct action of these units has the disadvantage that the vibrations produced are transmitted to their full extent to the vehicle.

SUMMARY OF THE INVENTION

An object of the present invention is to provide a device having a vibrator for producing seismic vibrations which is attached to a vehicle and which allows swiveling of the base plate to adapt to uneven ground, the device being producible at low cost and with small construction.

With a device according to the invention, the entire vibrator can be attached to the vehicle in a structurally simple manner permitting simple swiveling and increasing the ease of servicing the device.

According to the invention, provision is made for the vibrator to be raisable or lowerable by two lifting devices which are arranged at the side of the reaction mass and are connected to the support plate of the vibrator. In one embodiment, the piston-cylinder units of the lifting devices are attached to a vehicle part by a belt-type bearing in order to allow swiveling of the base plate to adapt to uneven ground. The axis of the belt-type bearing is preferably aligned transversely to the longitudinal axis of the vehicle. In particular, the suspension of the belt-type bearing can be attached to longitudinal members of the vehicle. In order to compensate for production tolerances, the suspension of the belt-type bearing can have a rotatable, eccentric bearing bushing. In order to hold the vibrator in a normally vertical position relative to the vehicle, provision is preferably made for the piston-cylinder units to be connected to a vehicle part through a spring-loaded stabilizing connection. This connection includes a double spring which is prestressed on both sides and is attached, on one hand, to the piston cylinder unit with spacing from the belt-type bearing and, on the other hand, to a vehicle part.

Annular clamping elements can be used to connect the support plate of the vibrator to the piston of the piston-cylinder units. On the other hand, the clamping can also be of swivelable construction by using pendulum support bearings at this point.

Integrated pressure-limiting valves are advantageously assigned to the piston-cylinder units in which case it is also possible for integrated, releasable non-return valves to be integrated in the piston-cylinder units in order to guarantee the greatest possible safety of the apparatus. The piston-cylinder units can be constructed as differential cylinders or twin-drive cylinders.

The invention makes possible a very cost-effective vibrator structure. This is achieved, in part, because guiding and operating cylinders form a unit and any required safety apparatus is integrated into the piston-cylinder unit. Furthermore, the construction according to the invention allows the vibrator to be uncoupled in a simple manner from the piston-cylinder units and to be repaired or exchanged for servicing.

The design of the vibrator according to the invention leads to an increased protection against damage if the base plate hits an obstacle when, for example, the site of the vehicle is changed on uneven terrain. Due to the tiltable design of the entire vibrator, the base plate can be set down on an area of the ground in such a way that good contact with the earth is achieved at the site. The reaction mass swivels relative to the base plate in the same direction in any case, regardless of the position of the vibrator relative to the vehicle.

The method of producing vibrations, setting-down the vibrator and pressing against the ground take place substantially in known ways.

With a device according to the invention, it is also possible to place the center of gravity of the vibrator as low as possible. Only the lifting cylinder is located above the actual vibrator. The vibrator can be of simple construction, is easily serviceable and is robust in practical use.

In a specific embodiment of the invention, the entire vibrator can be attached to the vehicle in a structurally simple manner, allowing simple swiveling of the base plate.

In this case, provision is likewise made for the vibrator to be raisable or lowerable by means of two lifting devices which are arranged at the side of the reaction mass and are connected to the support plate of the vibrator. The lifting cylinders are attached to fixed supports which are connected to the longitudinal members of the vehicle.

The lower ends of the piston rods of the cylinders are connected to the support plate of the vibrator by means of pendulum support bearings in order to allow swiveling of the base plate for adaptation to uneven ground. The axis of the pendulum support beating is preferably aligned transversely to the longitudinal axis of the vehicle.

BRIEF DESCRIPTION OF THE DRAWINGS

The invention is explained in greater detail below in connection with particularly advantageous embodiments and with reference to the accompanying drawings wherein.

DESCRIPTION OF THE PREFERRED EMBODIMENTS

Figure 1:
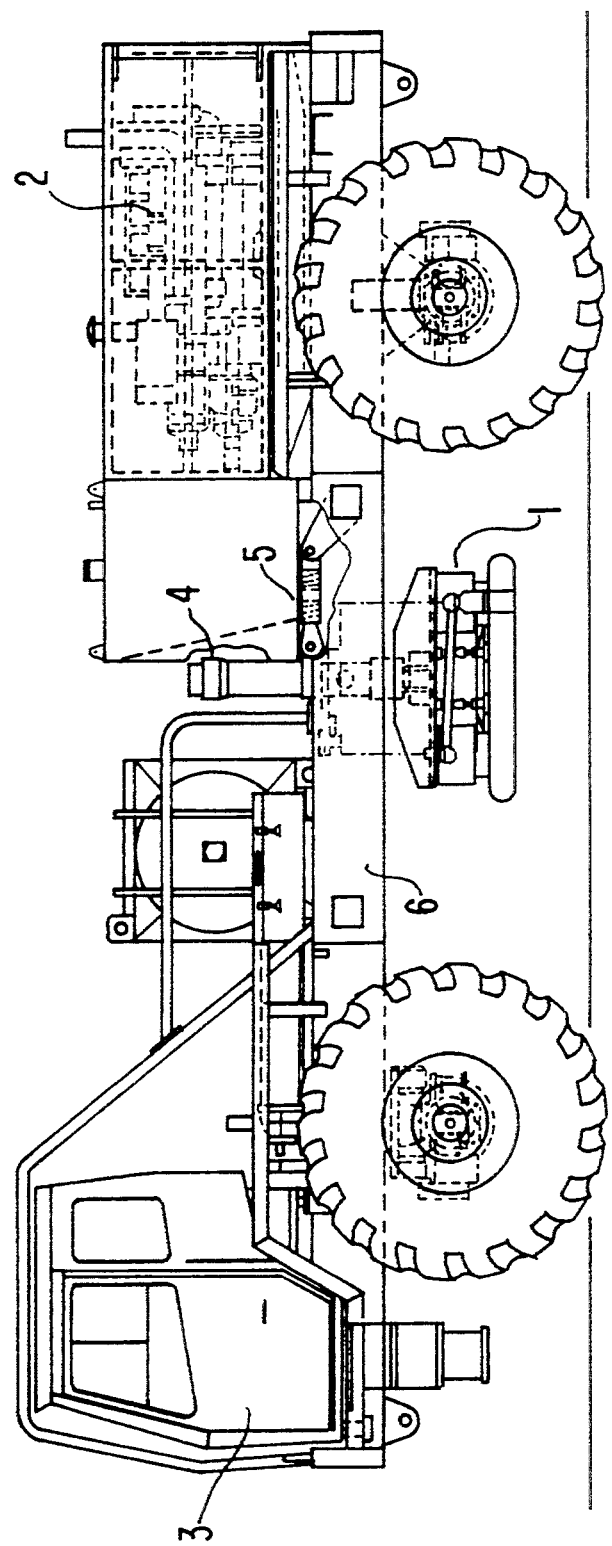
FIG. 1 is a side elevation of a vehicle having vibrator in accordance with the invention.

The vehicle illustrated in FIG. 1 has a driver's cab 3 and a power plant 2. Located between the axles of the vehicle is a vibrator 1 which is attached to longitudinal members 6 by means including lifting and guiding cylinders or piston-cylinder units 4 and stabilizers 5. Units 4 are essentially linear actuators.

FIG. 1 shows the vibrator in a raised position. For producing seismic energy, the piston-cylinder units 4, which are attached to the longitudinal members of the vehicle on opposite sides of the reaction mass, are extended so that the base plate of the vibrator presses onto the ground. Further extension of piston rods connected to the pistons of the cylinders raises the rear part of the vehicle from the ground so that virtually the entire weight of the vehicle is imposed on vibrator 1. In this position, the base plate is then caused to vibrate relative to a reaction mass in a known manner by actuating a differential piston-cylinder unit.

Figure 2:
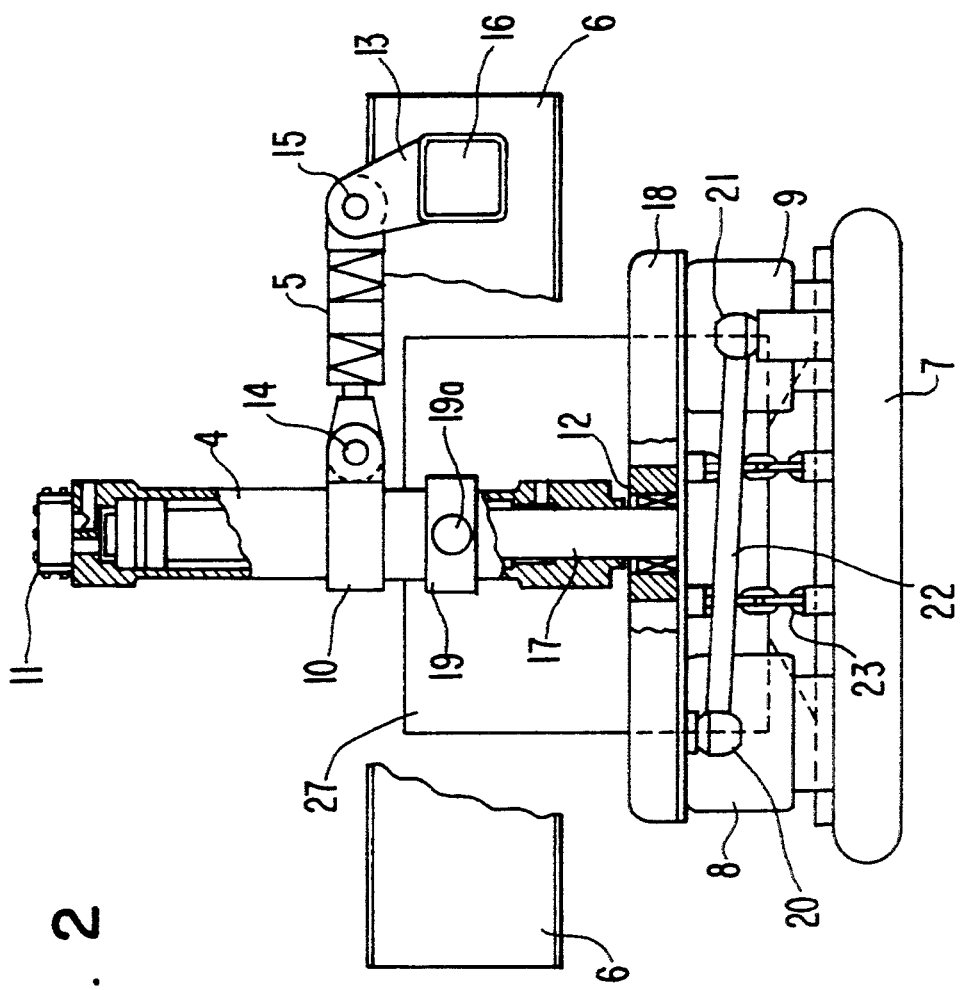
FIG. 2 is a side elevation of a vibrator usable in the apparatus of FIG. 1.

FIG. 2 shows a side view of the vibrator. The piston-cylinder unit 4 shown has a piston rod 17 attached at its lower end to the actual vibrator by annular clamping elements 12. The vibrator includes a support plate 18 and a base plate 7 which are interconnected by air-suspension buffers 8 and 9. The buffers acoustically decouple base plate 7 from support plate 18 so that vibrations produced between reaction mass 27 and base plate 7 are not transmitted into the vehicle by support plate 18.

In order to limit the lowering of base plate 7 in the raised position of the vibrator, chains 23 are provided between support plate 18 and base plate 7. Furthermore, parallel links 22 are provided which, through joints 20 on support plate 18 and joints 21 on base plate 7, prevent any tendency toward rotation and against displacement of the base plate relative to the support plate as soon as the vibrator rests on the ground.

Piston-cylinder units 4 serve both for lowering the vibrator and for its vertical guidance. In this case, the associated cylinders are attached to longitudinal members 6 of the vehicle by belt-type bearings 19. The belt-type bearings are known bearings each of which has an annular bearing member and a pivot axis 19a about which the annular bearing member is pivotable, allowing a tube supported in the annular bearing member to swivel or pivot about the pivot axis. The vibrator, including the cylinders, can therefore be swiveled about belt-type bearings 19, axes 19a being perpendicular to the longitudinal axis of the vehicle. It is thus possible to deflect base plate 7 relative to the horizontal plane in the event of unevenness of the ground.

In order to hold the base plate of the vibrator in the normally horizontal position, a flange 10 is attached to the cylinders of piston-cylinder units 4 on both sides of the vehicle spaced upwardly from belt-type bearing 19, the flange being attached to a cross member 16 of the vehicle by a stabilizer 5 connected to a bracket 13. The stabilizer is linked to the flange and the bracket by pivot bearings 14 and 15 and is preferably a double, preloaded spring which normally holds the cylinder in its vertical position. If base plate 7 hits an obstacle or if the terrain is uneven, compression of one or the other spring within the stabilizer allows the cylinder of piston-cylinder unit 4 to be deflected from the vertical position, thereby achieving better adaptation to the ground as well as acting as a safeguard against the vibrator hitting obstacles. When no longer stressed, the cylinder of the vibrator returns to its vertical position.

The cylinder of piston-cylinder unit 4 is preferably constructed as a differential cylinder or twin-drive cylinder. By a twin-drive cylinder, it is meant that the piston has a piston rod extending through both ends of the cylinder, also termed a double-ended actuator. Located in the head of the cylinder are preferably a pressure-limiting valve and a releasable non-return valve. By this measure, the cylinder can serve simultaneously as a lifting cylinder and as a guiding cylinder.

Figure 3:
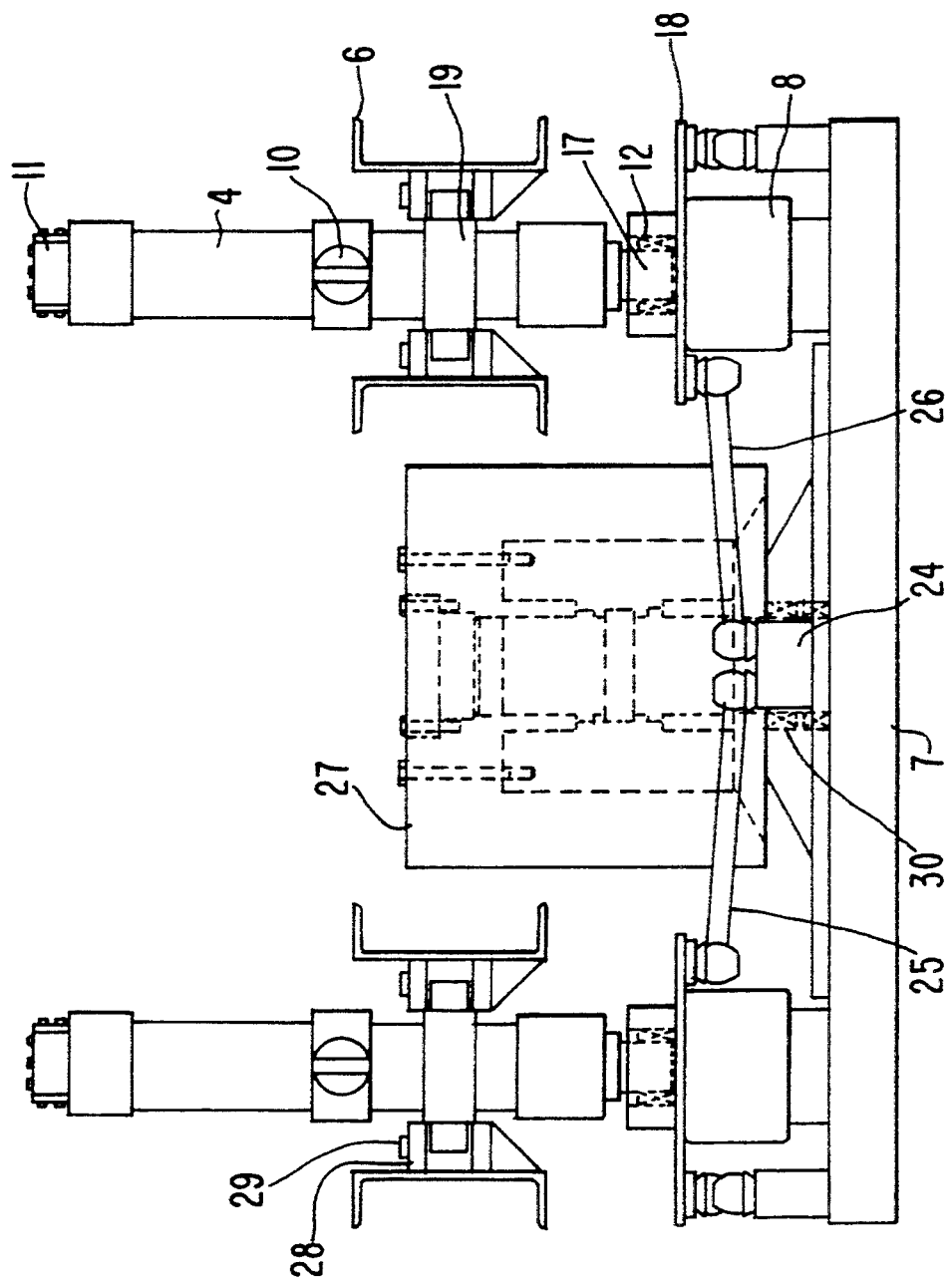
FIG. 3 is a rear elevation of the vibrator of FIG. 2.

FIG. 3 shows a rear view of the vibrator. Two cylinders 4 are provided, each being attached to longitudinal members 6 of the vehicle by belt-type bearings 19. Bearings 19 are mounted in bearing bushings 28 which are preferably of eccentric construction so that they can be adjusted by adjusting screws 29.

Support plate 18 is attached to the lower end of piston rods 17. Located between the two cylinders is the reaction mass 27 whose central piston rod is anchored in bearing block 24, preferably by an annular clamping attachment. Provided in this case are two clamping links 25 and 26 which lie in a row in each case and limit the lateral deflection of the base plate.

It can be seen clearly that, after release of the annular clamping elements 12, the base plate together with support plate 18 and reaction mass 27 can be removed from the cylinders of piston-cylinder unit 4 and is therefore accessible is a simple way for exchange or servicing.

Figure 4:
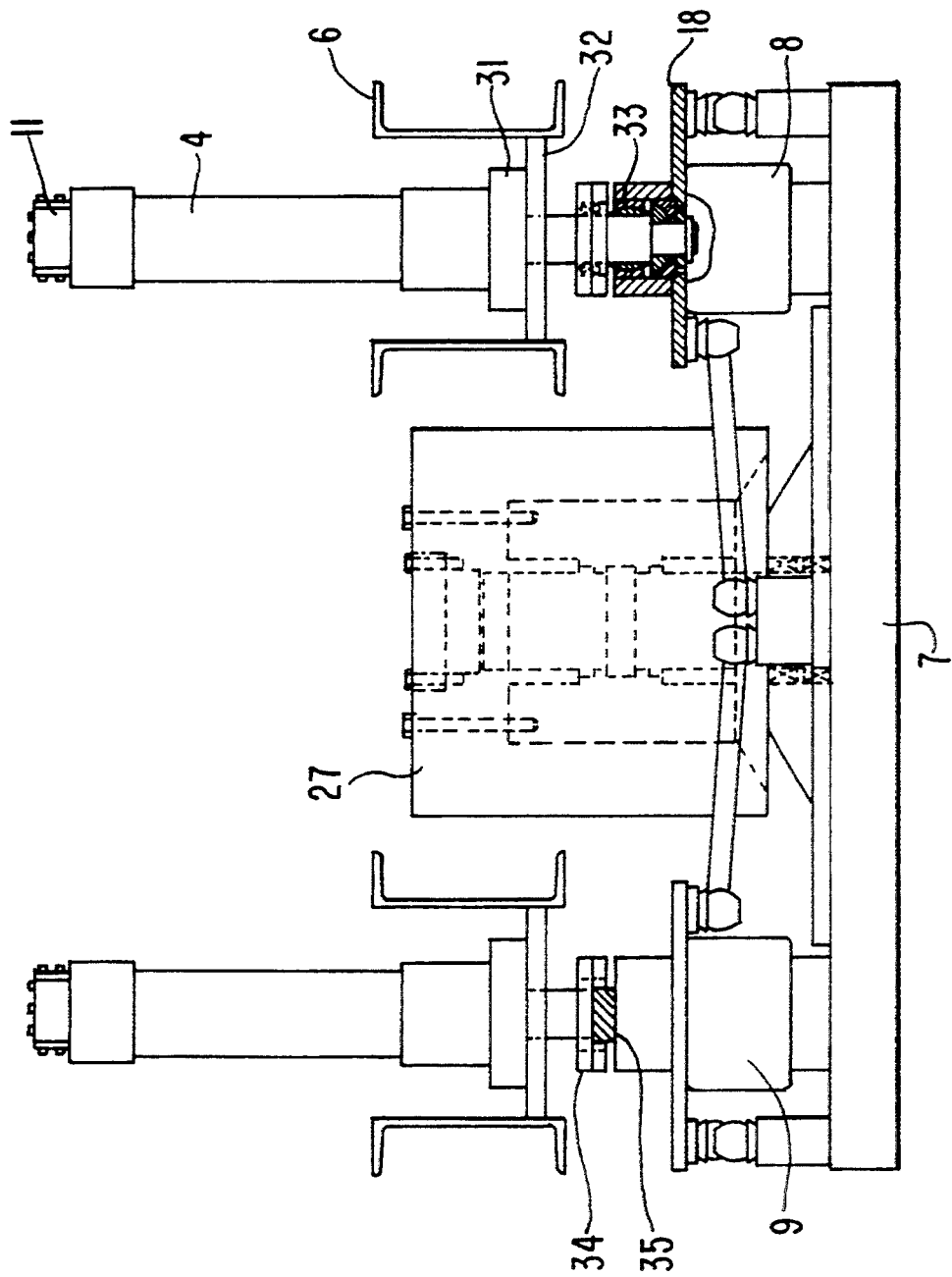
FIG. 4 is a rear elevation of a further embodiment of a vibrator in accordance with the invention.

FIG. 4 shows an alternative technique for attaching the vibrator. The lifting cylinders of piston-cylinder unit 4 are attached to fixed supports 32 which are connected to longitudinal members 6 of the vehicle. The lower ends of the piston rods of piston-cylinder units 4 are anchored in pendulum support bearings 33 which allow support plate 18 to be tilted relative to the piston rods of the cylinders. In this manner, adaptation of the base plate to uneven ground conditions is likewise achieved.

A dynamic stroke limiter 34 is provided which acts against a rubber-metal connection or a steel spring 35. The piston-cylinder units can be constructed in the same manner as in FIG. 2 and 3.

Figure 5:
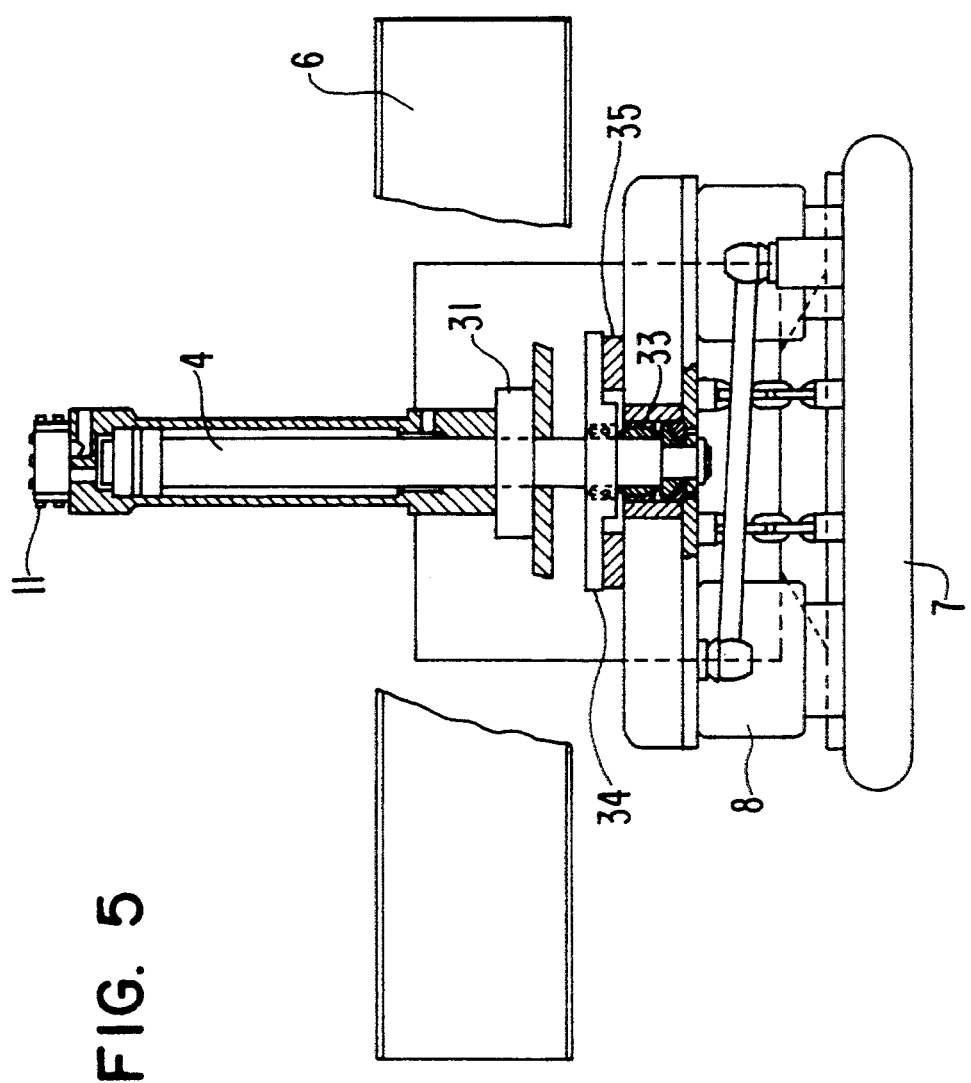
FIG. 5 is a side elevation of the vibrator of FIG. 4.

FIG. 5 shows a side view of an embodiment according to FIG. 4. The cylinder of the piston-cylinder unit 4 is connected firmly to cross member 32 by a cylinder-flange attachment. The lower end of the piston rod of the cylinder terminates in a pendulum support bearing 33. The pistons of piston-cylinder units 4 need only be extended far enough so that the rear axle of the vehicle is just raised from the ground.

A load-dependent stroke cutoff is therefore preferably used in which only such an amount of hydraulic pressure is fed into the cylinder as will just bring about raising of the rear axle of the vehicle. The stroke cutoff is preferably achieved by using pressure relief valves, which are known per se, in the heads of the cylinders.

This results in the advantage that no misalignments of the vibrator occur and that the working stroke of the cylinders can be kept small, thus also resulting in lower fuel consumption and higher service life of the cylinders.

What is claimed is:

1. An apparatus for producing seismic vibrations in the earth comprising the combination of
   a vehicle;
   a vibrator having a base plate and a reaction mass (27);
   first and second lifting devices on opposite sides of said reaction mass for supporting and lowering to a surface of the earth said base plate and said reaction mass together whereby said base plate can be raised to a transportation position adjacent said vehicle and lowered to a working position against the earth, each said lifting device including a piston-cylinder assembly acting between said baseplate and mass and said vehicle, and
   belt-type bearing means connecting said vehicle to each said piston-cylinder assembly so that said base plate can swivel relative to horizontal to permit adaptation to uneven ground.

2. An apparatus according to claim 1 wherein each said belt-type bearing means has an axis aligned transversely to a longitudinal axis of said vehicle.

3. An apparatus according to claim 1 wherein each said belt-type bearing means is mounted on a longitudinal member of said vehicle.

4. An apparatus according to claim 1 wherein each said belt-type bearing includes a rotatable, eccentric bearing bushing.

5. An apparatus according to claim 1 and further including a spring-loaded stabilizer connected between each said piston-cylinder unit and a portion of said vehicle.

6. An apparatus according to claim 5 wherein each said stabilizer includes a double spring having both spring portions thereof pre-loaded, each said stabilizer being connected at one end to a location on said piston-cylinder unit spaced from said belt-type bearing and at the other end to said portion of said vehicle.

7. An apparatus according to claim 1 wherein said vibrator further includes a plurality of support plates, each said piston cylinder assembly includes a piston rod attached to one said support plate, said apparatus further including annular clamping elements attaching said rods to said support plates.

8. An apparatus according to claim 1 wherein said vibrator further includes a plurality of support plates, each said piston cylinder assembly includes a piston rod attached to one said support plate, said apparatus further including pendulum support bearings attaching said rods to said support plates.

9. An apparatus according to claim 1 wherein each said piston-cylinder unit includes integrated pressure-limiting valves.

10. An apparatus according to claim 1 wherein each said piston-cylinder unit includes integrated releasable non-return valves.

11. An apparatus according to claim 1 wherein each said piston-cylinder unit is constructed as a differential cylinder.

12. An apparatus according to claim 1 wherein each said piston-cylinder unit is constructed as a double-ended linear actuator.

13. An apparatus for producing seismic vibrations in the earth comprising the combination of
   a vehicle having longitudinally extending frame members;
   a vibrator comprising a base plate, a reaction mass and a support plate coupled to said base plate;
   first and second lifting devices on opposite sides of said reaction mass for supporting and lowering to a surface of the earth said vibrator whereby said base plate can be raised to a transportation position adjacent said vehicle and lowered to a working position and pressed against the earth, each said lifting device including a piston-cylinder assembly acting between said vibrator and said vehicle;

means for fixedly connecting an upper end of each of said piston-cylinder assemblies to one of said frame members;

pendulum support bearing means connecting said support plate to lower ends of each of said piston-cylinder assemblies, said pendulum support bearing means including elongated rods pivotally connected at upper ends to said lower ends of said piston-cylinder assemblies and at lower ends to said support plate so that said base plate can be swiveled relative to horizontal to permit adaptation to uneven ground.

14. An apparatus according to claim 13 and including a pressure limiting valve integrated into each cylinder of said piston-cylinder units.

15. An apparatus according to claim 13 wherein each said piston-cylinder unit is constructed as a differential cylinder.

16. An apparatus according to claim 13 wherein each said piston-cylinder unit is constructed as a double-ended linear actuator.

* * * * *